(12) United States Patent
Yoda (10) Patent No.: US 11,453,072 B2
(45) Date of Patent: Sep. 27, 2022

(54) THREAD MILLING CUTTER

(71) Applicant: OSG CORPORATION, Toyokawa (JP)

(72) Inventor: Tomonori Yoda, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 717 days.

(21) Appl. No.: 16/349,683

(22) PCT Filed: Jan. 18, 2017

(86) PCT No.: PCT/JP2017/001605
§ 371 (c)(1),
(2) Date: May 14, 2019

(87) PCT Pub. No.: WO2018/134924
PCT Pub. Date: Jul. 26, 2018

(65) Prior Publication Data
US 2019/0358717 A1    Nov. 28, 2019

(51) Int. Cl.
*B23G 5/18* (2006.01)
*B23C 5/10* (2006.01)
*B23G 5/20* (2006.01)

(52) U.S. Cl.
CPC ............... *B23C 5/10* (2013.01); *B23G 5/184* (2013.01); *B23G 5/20* (2013.01);
(Continued)

(58) Field of Classification Search
CPC ........ B23G 2200/145; B23G 2200/143; B23G 5/188; B23G 5/184; B23G 5/18; B23G 5/20; B23G 2200/14; B23C 2200/52
See application file for complete search history.

(56) References Cited

U.S. PATENT DOCUMENTS

| 4,930,949 A | 6/1990 | Giessler |
| 5,678,962 A * | 10/1997 | Hyatt ............... B23G 5/188 408/222 |

(Continued)

FOREIGN PATENT DOCUMENTS

| CN | 207942025 U | 10/2018 |
| DE | 3808797 A1 | 10/1989 |

(Continued)

OTHER PUBLICATIONS

Office Action dated Mar. 6, 2020, issued in counterpart CN Application No. 201780067559.8, with English Translation. (13 pages).

(Continued)

*Primary Examiner* — Alan Snyder
(74) *Attorney, Agent, or Firm* — WHDA, LLP (57) ABSTRACT

The end cutting edges formed on the front end face of the tool body includes a first end cutting edge that is connected to the front end of the thread cutting edge, and a second end cutting edge that is connected to the first end cutting edge on the side closer to the axis, and is angled more toward the rear end than the first end cutting edge. The angle formed by an imaginary plane perpendicular to the axis and the first end cutting edge is set to 6° or less. The angle formed by the second end cutting edges and the imaginary plane perpendicular to the axis and is set to be greater than the angle formed by the first end cutting edges and the imaginary plane perpendicular to the axis.

3 Claims, 4 Drawing Sheets

(52) U.S. Cl.
CPC .... *B23G 2200/143* (2013.01); *B23G 2210/04* (2013.01); *B23G 2225/28* (2013.01)

(56) References Cited

U.S. PATENT DOCUMENTS

| | | | |
|---|---|---|---|
| 5,733,078 A * | 3/1998 | Matsushita | B23G 1/32 408/222 |
| 2015/0190868 A1 | 7/2015 | Koifman et al. | |

FOREIGN PATENT DOCUMENTS

| | | |
|---|---|---|
| DE | 10162430 A1 | 7/2003 |
| DE | 10334454 B3 | 5/2005 |
| EP | 334002 A2 | 9/1989 |
| EP | 0432621 A2 | 6/1991 |
| JP | 9-225743 A | 9/1997 |
| JP | 10-34441 A | 2/1998 |
| JP | 2001-198724 A | 7/2001 |
| JP | 2012-86286 A | 5/2012 |
| JP | 2017-502848 A | 1/2017 |
| WO | 2004/022274 A1 | 3/2004 |
| WO | 2015/104703 A1 | 7/2015 |

OTHER PUBLICATIONS

Notification of Transmittal of Translation of the International Preliminary Report on Patentabililty (Form PCT/IB/338) issued in counterpart International Application No. PCT/JP2017/001605 dated Aug. 1, 2019 with Forms PCT/IB/373, PCT/ISA/237, PCT/IB/326, with English translation (15 pages).

Extended Search Report dated Jun. 4, 2020, issued in counterpart EP Application No. 17892514.5 (5 pages).

International Search Report dated Apr. 4, 2017, issued in counterpart application No. PCT/JP2017/001605, w/English translation (5 pages).

Written Opinion dated Apr. 4, 2017, issued in counterpart application No. PCT/JP2017/001605 (4 pages).

* cited by examiner

THREAD MILLING CUTTER

TECHNICAL FIELD

This invention relates to thread milling cutters, and more particularly to a thread milling cutter that performs drilling and threading at the same time.

BACKGROUND ART

Thread milling cutters have been conventionally used as a tool for cutting internal threads in a workpiece. The thread milling cutters are provided with thread cutting edges around their bodies, and perform thread cutting operations with driving apparatuses, such as NC milling machines, that rotate the thread milling cutters about an axis while moving them relative to a workpiece.

Some of the thread milling cutters have end cutting edges at the front end face of their tool bodies, and the end cutting edges eliminate the need for a pre-drilling operation, which is to be performed by another tool as an upstream operation before the thread cutting operation, in order to achieve simultaneous operation of drilling and threading (Patent Literature 1).

CITATION LIST

Patent Literature

Patent Literature 1: Japanese Patent Application Laid-Open No. 2012-86286

SUMMARY OF INVENTION

Technical Problem

However, the thread milling cutter in Patent Literature 1 tends to be deflected with respect to the central axis of the internal threads owing to a radial force applied by the workpiece, which shortens the tool life of the thread milling cutter.

The present invention has been made to solve the problem, and has an object to provide a thread milling cutter with a long tool life.

Solution to Problem

For the purpose of achieving the object, the thread milling cutter in this invention cuts internal threads in a workpiece with a driving apparatus that rotates the thread milling cutter about an axis and moves the thread milling cutter relative to the workpiece, and the thread milling cutter includes a tool body held and rotated about the axis by the driving apparatus, thread cutting edges in a plurality of threads projecting in directions perpendicular to the axis from a front end side of an outer circumference of the tool body, and end cutting edges formed on a front end face of the tool body. Each of the end cutting edges includes a first end cutting edge that is connected to the front end of the thread cutting edge, and the first end cutting edge and an imaginary plane perpendicular to the axis form an angle of 6° or less. Each of the end cutting edges also includes a second end cutting edge that is connected to the first end cutting edge on the side closer to the axis, and is angled more toward the rear end than the first end cutting edge. An angle formed by the imaginary plane perpendicular to the axis and the second end cutting edge is set to be greater than the angle formed by the imaginary plane perpendicular to the axis and the first end cutting edge.

Advantageous Effects of Invention

According to the thread milling cutter of claim 1, the angle formed by an imaginary plane perpendicular to the axis of the tool body and the first end cutting edge is set to 6° or less. This can strengthen an axial bracing force generated in the thread milling cutter between the workpiece and driving apparatus. Consequently, the thread milling cutter resists deflection toward a central axis of the internal threads.

In addition, the angle formed by the imaginary plane perpendicular to the axis and the second end cutting edges is set to be greater than the angle formed by the imaginary plane perpendicular to the axis and the first end cutting edges. Therefore, the cutting resistance between the second end cutting edges and workpiece can be reduced in comparison with the cutting resistance between the first end cutting edges and the workpiece. Thus, the cutting resistance reduction by the second end cutting edges and the deflection-resistance of the thread milling cutter by the first end cutting edges produce the effect of extending the tool life of the thread milling cutter.

According to the thread milling cutter of claim 2, the diameter passing through the boundary between the thread cutting edges and the first end cutting edges and the axis at the center is set to be equal to or greater than a minor diameter between the threads. With this diameter size setting, a strong axial bracing force generated in the thread milling cutter between the first end cutting edges and driving apparatus can be located more outward in the direction perpendicular to the axis in comparison with the case where the boundary between the thread cutting edges and first end cutting edges is located more inward in the direction perpendicular to the axis than the roots between threads. Consequently, the thread milling cutter further resists deflection toward the central axis of the internal threads, and therefore, in addition to the effect provided by claim 1, the thread milling cutter can have the effect of further extending the tool life.

According to the thread milling cutter of claim 3, the size of the first end cutting edges in the direction perpendicular to the axis is set to 10% or less of the minor diameter between the threads. Setting the size of the first end cutting edges in this manner can reduce the contact area between the first end cutting edges and the workpiece, thereby reducing the cutting resistance between the first end cutting edges and workpiece. Since the less cutting resistance can reduce wear and breakage of the thread cutting edges and end cutting edges, in addition to the effect provided by claim 1 or 2, the thread milling cutter can have the effect of further extending the tool life.

According to the thread milling cutter of claim 4, the angle formed by the first end cutting edges and the imaginary plane perpendicular to the axis is set to be greater than 0°. This angle setting can reduce the cutting resistance between the first end cutting edges and workpiece. Consequently, in addition to the effect of any one of claims 1 to 3, the thread milling cutter can have the effect of further extending the tool life.

DESCRIPTION OF EMBODIMENTS

Figure 1:
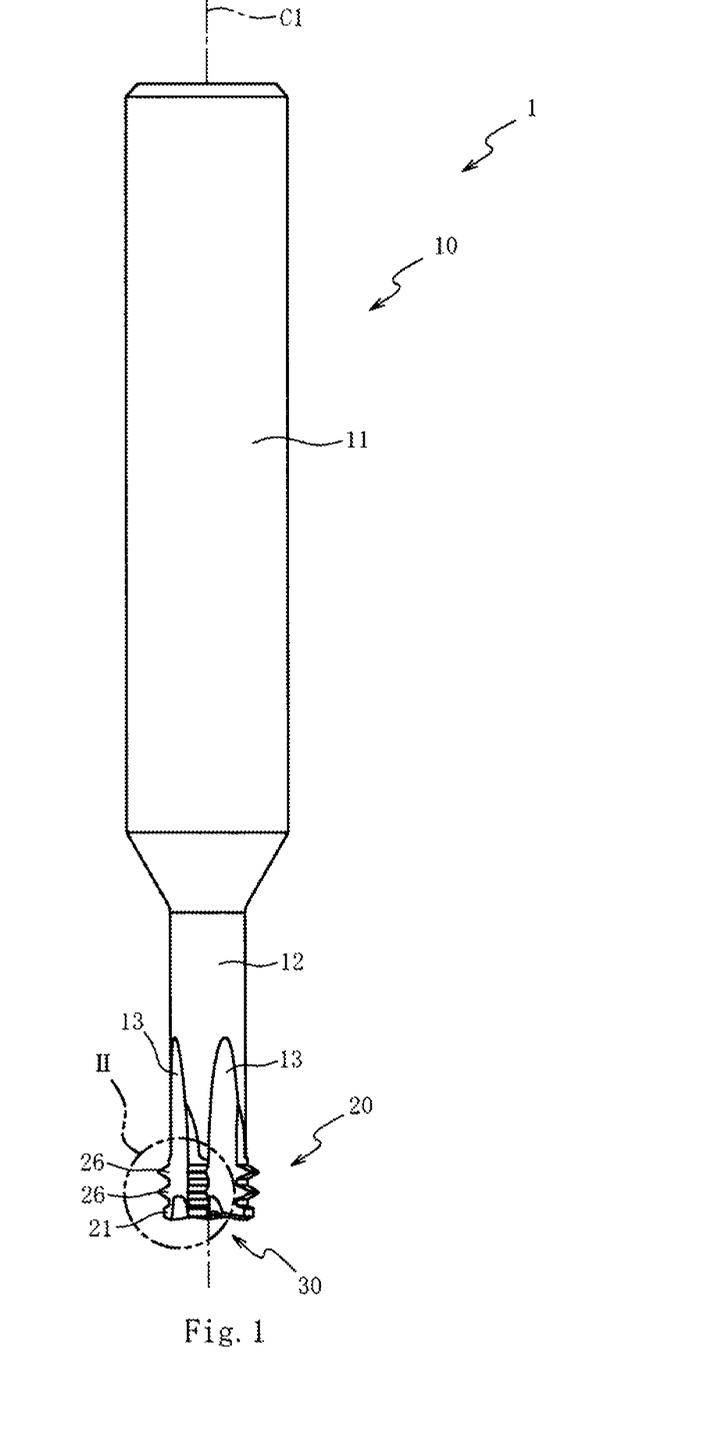
FIG. 1 is a front view of a thread milling cutter according to an embodiment of the present invention.

With reference to the accompanying drawings, a preferred embodiment of the present invention will be described below. First, a thread milling cutter 1 according to the embodiment of the invention will be described by referring to FIG. 1. FIG. 1 is a front view of the thread milling cutter according to the embodiment of the invention.

As shown in FIG. 1, the thread milling cutter 1 is a tool for cutting internal threads 4 (see FIG. 4) in a workpiece W (see FIG. 4) by means of rotational force transmitted from a driving apparatus 2 (see FIG. 4), such as an NC milling machine and a machining center. The thread milling cutter 1 is made of cemented carbide such as pressed and sintered tungsten carbide. Note that the material of the thread milling cutter 1 is not limited to the cemented carbide, and can be made of, for example, high-speed tool steel.

The thread milling cutter 1 includes a cylindrical tool body 10 having an axis C1 at the center, and a first cutting section 20 and a second cutting section 30 used to cut the workpiece W. The tool body 10 includes a shank 11 provided on a rear end side (upper side in FIG. 1) thereof in the direction of the axis C1, and a body 12 provided continuously from the shank 11 on a front end side (lower side in FIG. 1) thereof in the direction of the axis C1.

The shank 11 is held by the driving apparatus 2. The thread milling cutter 1 cuts the internal threads 4 in the workpiece W using a driving force transmitted from the driving apparatus 2 that holds the thread milling cutter 1 with the shank 11. The driving force from the driving apparatus 2 rotates the thread milling cutter 1 about the axis C1 and also moves the thread milling cutter 1 relative to the workpiece W while helically feeding the thread milling cutter 1 into the workpiece W. The term "helical feeding" means moving the thread milling cutter 1 around a central axis C2 of the internal threads 4 to be formed while feeding the thread milling cutter 1 in the axis C1 direction with a synchronous feed mechanism.

The shank 11 is in the shape of a cylinder having a constant diameter along the axis C1. The shank 11, however, is not limited to the cylinder having a constant diameter along the axis C1, and the shank 11 can be tapered so as to reduce the diameter from the front end of the tool body 10 toward the rear end.

The body 12 includes the first cutting section 20 and second cutting section 30. The body 12, which is in the shape of a cylinder having a constant diameter along the axis C1, has a plurality of flutes 13, 14 (see flutes 14 in FIG. 3) formed by partially cutting out the body 12. The diameter of the body 12 is set to be smaller than that of the shank 11.

The flutes 13, 14 are grooves to evacuate chips created by the first cutting section 20 and second cutting section 30 cutting the workpiece W. The flutes 13 are provided on the circumferential face of the body 12. The flutes 14 are provided on the front end face of the body 12. The first cutting section 20 and second cutting section 30 are partitioned into a plurality of parts (four parts in this embodiment) in the circumferential direction of the tool body 10 by the flutes 13, 14, respectively.

Figure 2:
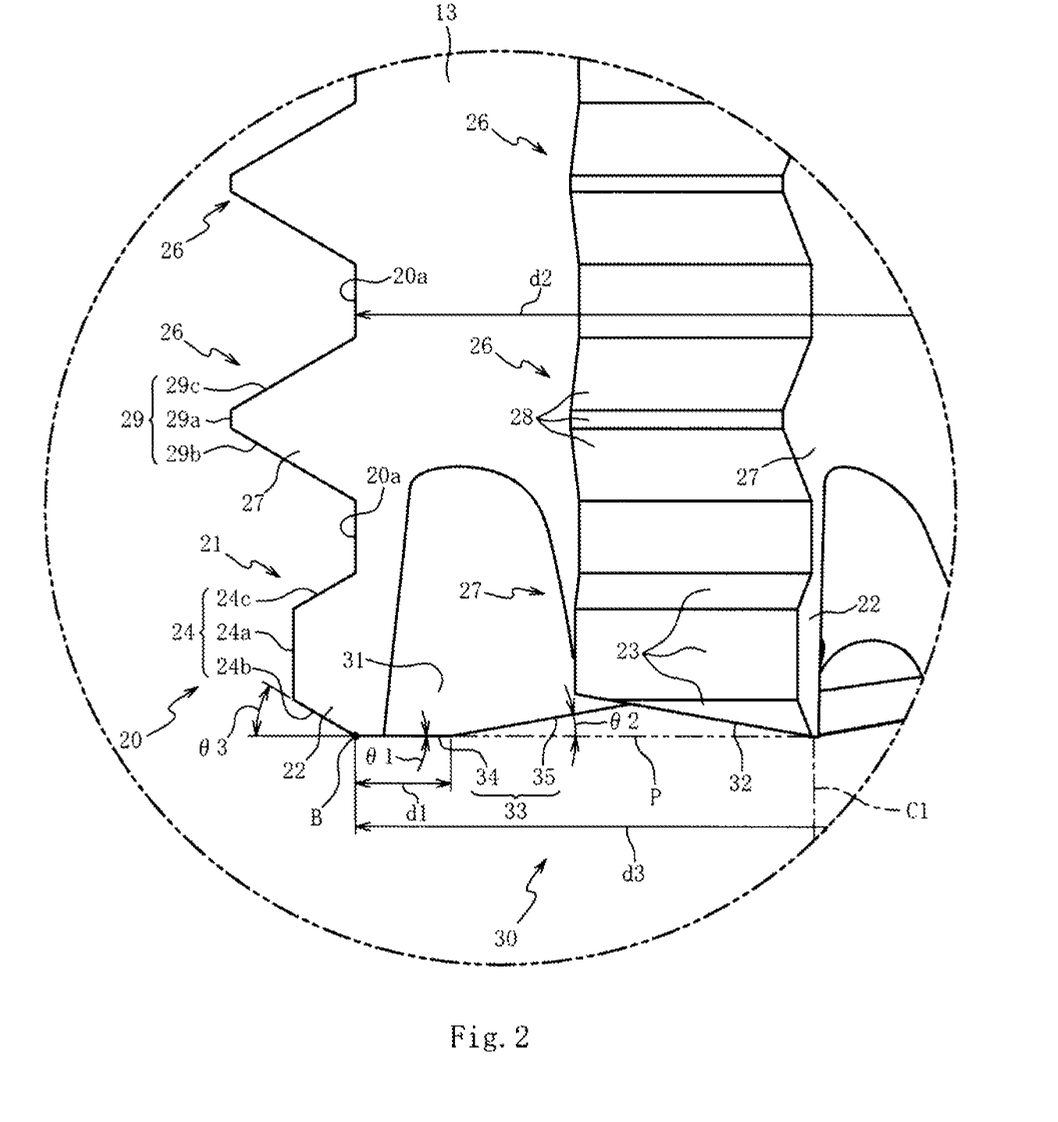
FIG. 2 is an enlarged view of the thread milling cutter, showing section II in FIG. 1.
Figure 3:
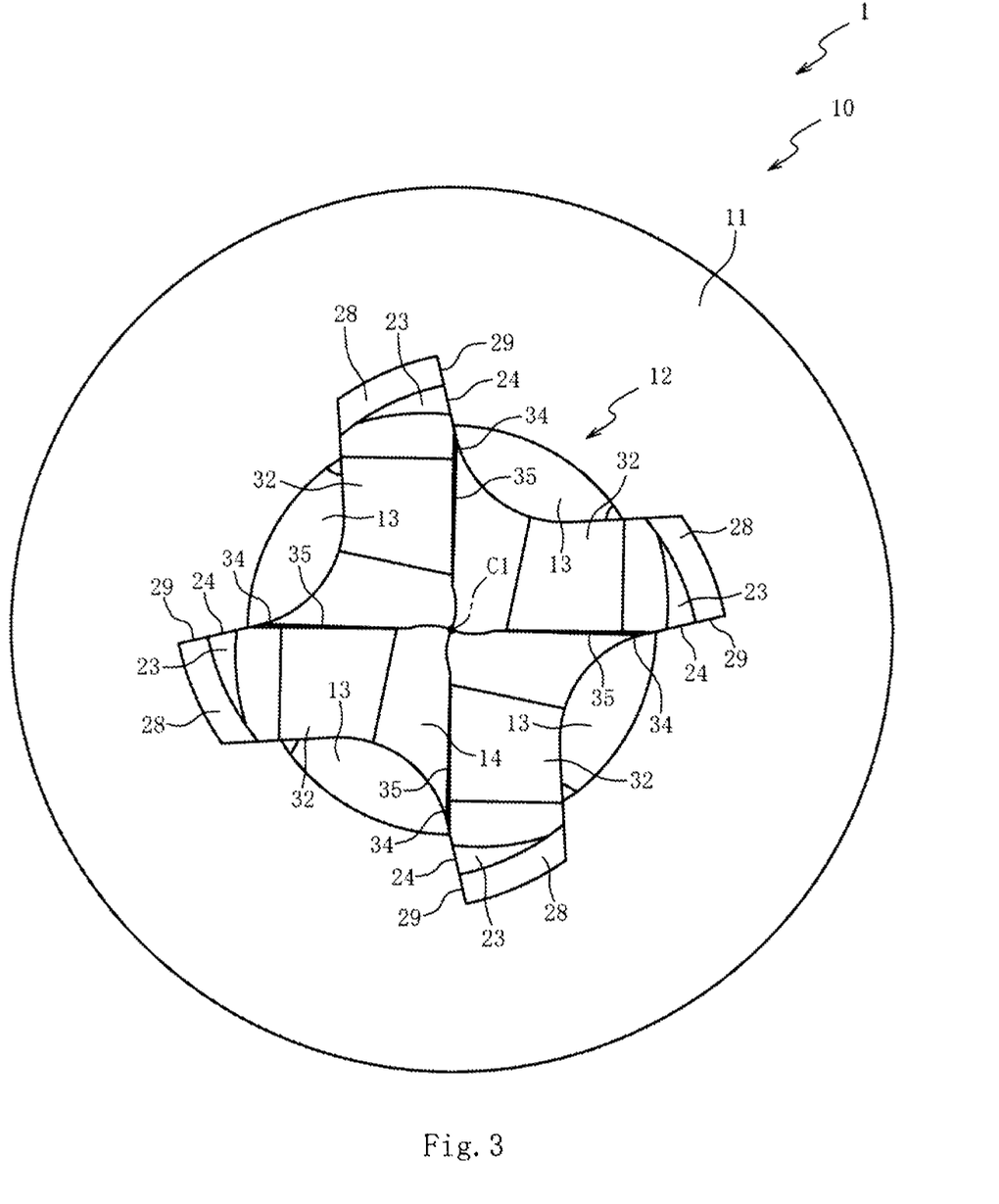
FIG. 3 is a bottom view of the thread milling cutter.

Referring to FIGS. 2 to 3, the first cutting section 20 and second cutting section 30 will be described. FIG. 2 is an enlarged view of the thread milling cutter 1 to show section II in FIG. 1. FIG. 3 is a bottom view of the thread milling cutter 1.

As shown in FIG. 2, the first cutting section 20 cuts internal threads on the inner surface of a drill hole. The first cutting section 20 has a plurality of thread portions projecting outward in the directions perpendicular to the axis from the outer circumference of the tool body 10. The thread portions are formed from the front end toward the rear end on the outer circumference of the tool body 10. The thread portions include a front thread portion 21 having a thread at the forward end of the tool body 10, and a rear thread portion 26 having two threads other than the front thread portion 21.

The front thread portion 21 includes front rake faces 22, front relief faces 23, and front cutting edges 24 each formed on a ridge made with a front rake face 22 and front relief faces 23. The rear thread portion 26 includes rear rake faces 27, rear relief faces 28, and rear cutting edges 29 each formed on a ridge made with a rear rake face 27 and rear relief faces 28.

The front rake faces 22 and rear rake faces 27 are used to produce and evacuate chips of the workpiece W, respectively, when the front cutting edges 24 and rear cutting edges 29 cut the workpiece W. The front rake faces 22 and rear rake faces 27 are both located on the forward side of the outer faces of the front thread portion 21 and rear thread portion 26, respectively, in the cutting rotation direction.

The front relief faces 23 and rear relief faces 28 are formed to reduce the contact area between the first cutting section 20 and workpiece W, respectively, when the front cutting edges 24 and rear cutting edges 29 cut the workpiece W. The front relief faces 23 and rear relief faces 28 are all located on the circumferential side of the outer faces of the front thread portion 21 and rear thread portion 26, respectively.

The front cutting edges 24 and rear cutting edges 29 are thread-like parts that dig into the workpiece W and cut the workpiece W. Each of the front cutting edges 24 includes a crest 24a, a flank 24b connected with the front end of the crest 24a (on the second cutting section 30 side), and a flank 24c connected with the rear end of the crest 24a (on the shank 11 side). Each of the rear cutting edges 29 includes a crest 29a, a flank 29b connected with the front end of the crest 29a, and a flank 29c connected with the rear end of the crest 29a.

The ridge connecting the flank 24c with the flank 29b and the ridge connecting the flank 29c of the front one of the two rear cutting edges 29 with the flank 29b of the other in the axial direction are roots 20a. The roots 20a are bottoms between a plurality of threads including the front cutting edges 24 and rear cutting edges 29. The front cutting edges 24, rear cutting edges 29, and roots 20a serve as thread cutting edges to cut internal threads 4 in the workpiece W (see FIG. 4). The height from the root 20a to the crest 24a of the front cutting edge 24 is set shorter than the height from the root 20a to the crest 29a of the rear cutting edge 29.

The thread milling cutter 1 having such designed thread cutting edges 20a, 24, 29 is helically fed to cut internal threads 4 in the workpiece W. Firstly, the front cutting edges 24 roughly cut the workpiece W, and then the rear cutting edges 29 make a finish cut on the part uncut by the front cutting edges 24 to cut threads in the workpiece W. The rough cut by the front cutting edges 24 can reduce the load on the rear cutting edges 29 that make a finish cut. Consequently, the rear cutting edges 29 is less susceptible to wear, and therefore the cutting accuracy of the thread cutting edges 20a, 24, 29 can be improved.

As shown in FIGS. 2 and 3, the second cutting section 30 is used to cut a drill hole having a diameter corresponding to the inner diameter of the internal threads 4. The second cutting section 30 is provided at the front end face of the tool body 10, or, at the bottom face of the tool body 10. The second cutting section 30 includes bottom rake faces 31, bottom relief faces 32, and end cutting edges 33 each formed at a ridge between a bottom rake face 31 and a bottom relief face 32.

The bottom rake faces 31 are formed to produce and evacuate chips of the workpiece W when the bottom cutting edges 33 cut the workpiece W. The bottom rake faces 31 are located on the forward side of the outer faces of the second cutting section 30 in the cutting rotation direction. The bottom relief faces 32 are formed to reduce the contact area between the second cutting section 30 and workpiece W when the end cutting edges 33 cut the workpiece W. The bottom relief faces 32 are a part of the front end face of the tool body 10.

The end cutting edges 33 dig into the workpiece W to cut the workpiece W. The end cutting edges 33 are rotationally symmetrical about the axis C1. Each of the end cutting edges 33 includes a first end cutting edge 34 connected to the flank 24b on the forward side of the front cutting edge 24, and a second end cutting edge 35 connected to the first end cutting edge 34 on the axis C1 side.

The angle θ1 which the first end cutting edge 34 forms with an imaginary plane P perpendicular to the axis C1 is set to 6° or less (0° in this embodiment). The angle θ3 which the imaginary plane P forms with the flank 24b is set to 30° in this embodiment. The angle θ3 is not limited to 30°, and is set in accordance with the shape of the internal threads 4 to be formed.

A preferable width d1 of the first end cutting edge 34 (size in the direction perpendicular to the axis) is 10% or less of the diameter d2 passing through the root 20a and axis C1 at the center (hereinafter referred to as "minor diameter"). In this embodiment, the ratio of the width d1 to the minor diameter d2 is set to 6%. The diameter d3 passing through the boundary B between the first end cutting edge 34 and flank 24b and the axis C1 at the center is set to be equal to or greater than the minor diameter d2 at the root 20a. In this embodiment, the minor diameter d2 is set to be equal to the diameter d3.

The second end cutting edges 35 are formed to reduce the cutting resistance of the end cutting edges 33. The second end cutting edges 35 are angled more toward the rear end of the tool body 10 than the first end cutting edges 34. The angle θ2 which the second end cutting edge 35 forms with the imaginary plane P is set to be greater than the angle θ1. In this embodiment, the angle θ2 is set to 10°.

Figure 4:
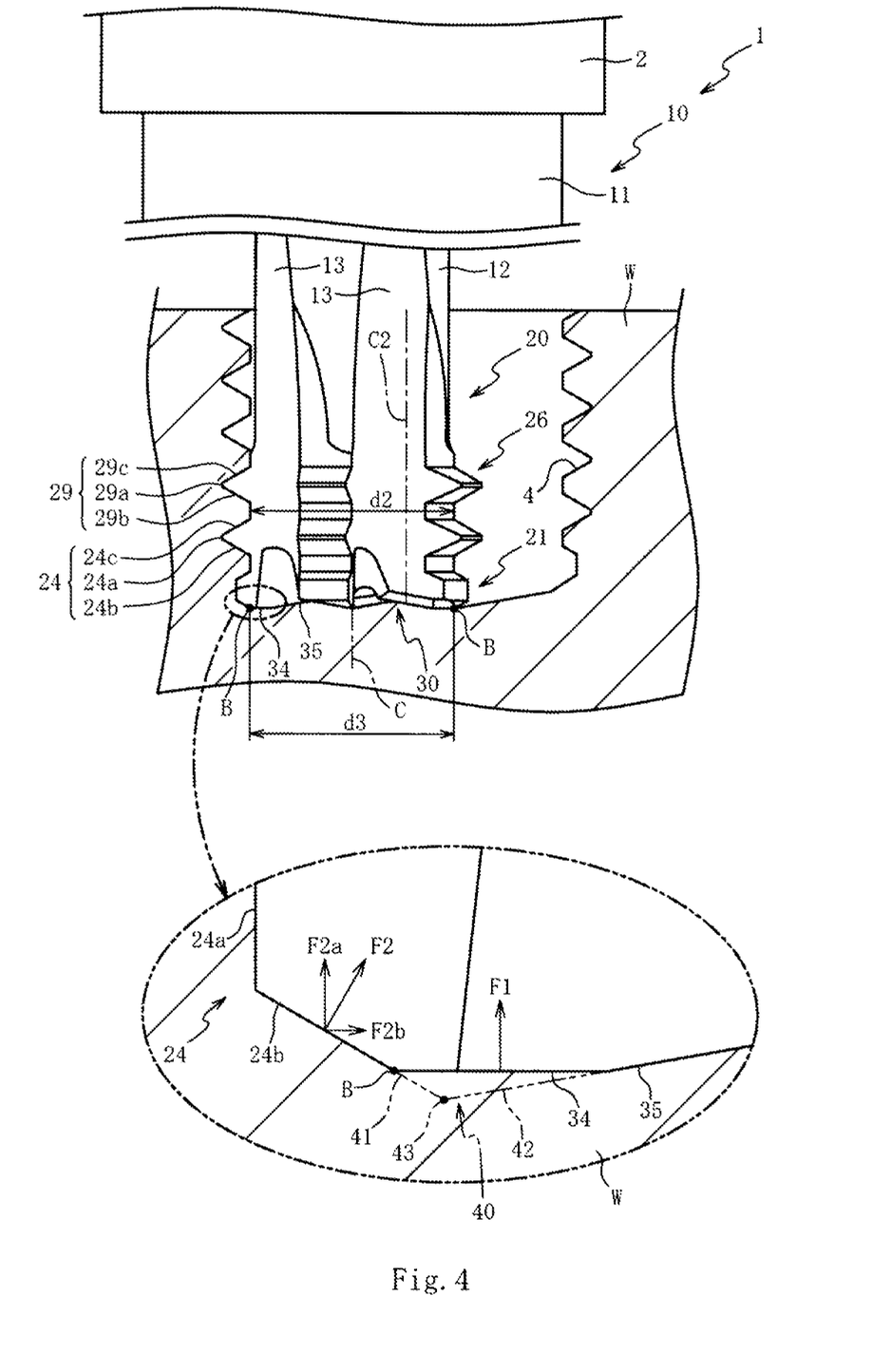
FIG. 4 is an explanatory schematic drawing of a thread cutting operation using the thread milling cutter.

With reference to FIGS. 2 and 4, the cutting action of the thread milling cutter 1 will be described. FIG. 4 is an explanatory schematic drawing of thread cutting operation using the thread milling cutter 1. FIG. 4 shows a thread milling cutter 40 which is one of related art (e.g., Patent Literature 1) having no first end cutting edge 34 unlike the present embodiment, but having a flank 41 that is extended downward from the flank 24b of the front cutting edge 24, a second end cutting edge 42 that is extended downward from the second end cutting edge 35, and an intersection 43 of the flank 41 and the second end cutting edge 42. The flank 41, second end cutting edge 42, and intersection 43 are indicated by dashed double-dotted lines.

As shown in FIGS. 2 and 4, a workpiece W is held on a mounting device (not shown), and the shank 11 of the thread milling cutter 1 is inserted into a driving apparatus 2. The driving apparatus 2 helically feeds the thread milling cutter 1, while rotating it on its axis C1, to cause the end cutting edges 33 to cut a drill hole in the workpiece W, and also to cause the thread cutting edges 20a, 24, 29 to cut threads on the inner circumferential surface of the drill hole. Thus, the internal threads 4 are formed in the workpiece W.

When the thread milling cutter 40 in the related art starts cutting the workpiece W, the intersection 43 first makes contact with the workpiece W. The intersection 43 and its vicinity have a tapered geometry, which is defined by an angle θ3 formed by the imaginary plane P perpendicular to the axis C1 and the flanks 24b, 41 and an angle θ2 formed by the imaginary plane P and the second end cutting edges 35, 42, and are relatively low in durability and therefore are susceptible to wear.

On the other hand, the thread milling cutter 1 in this embodiment first makes contact with the workpiece W at a part that is defined by the angle θ1, which is less than the angle θ2, formed by the imaginary plane P and the first end cutting edge 34, and the angle θ2 or the angle θ2. Because of this, the end cutting edges 33 of the thread milling cutter 1 can have higher durability than thread milling cutter 40, and therefore are more wear resistant. Especially, when the thread milling cutter 1 starts cutting the workpiece W, the first end cutting edges 34 at an angle closer to 0° entirely make contact with the workpiece W substantially at a time, and therefore the first end cutting edges 34 and second end cutting edges 35 become more wear resistant.

The end cutting edges 33 entirely make contact with the workpiece W to cut a drill hole. Since the end cutting edges 33 are rotationally symmetrical about the axis C1, the forces applied to the end cutting edges 33 from the workpiece W in the directions perpendicular to the axis are counterbalanced.

On the other hand, the thread cutting edges 20a, 24, 29 partially make contact with the workpiece W in the circumferential direction to cut threads. In other words, parts of the thread cutting edges 20a, 24, 29 make contact with the workpiece W, while the other parts, which are opposed to the contact parts with respect to the axis C1, do not make contact with the workpiece W.

Because of this, a force that acts in the direction from the inner circumferential surface of the internal threads 4 to the central axis C2 of the internal threads 4 is generated in the thread milling cutter 1. If this force is large, the thread milling cutter 1 is prone to deflect toward the central axis C2 of the internal threads 4. The larger the deflection of the thread milling cutter 1 toward the central axis C2 of the internal threads 4 is, the smaller the pitch diameter of the internal threads 4 becomes. Consequently, the driving apparatus 2 needs to correct the thread milling cutter 1 at a stage where the pitch diameter has been reduced by a certain amount or more. Therefore, the thread milling cutter 1 being more prone to deflect toward the central axis C2 of the internal threads 4 needs to be corrected more frequently.

The flank 24b of the front cutting edge 24 receives a force F2 in the direction perpendicular to the flank 24b from the workpiece W. The component F2b of the force F2 in the direction perpendicular to the axis causes deflection of the thread milling cutter 1. On the other hand, the component F2a of the force F2 in the axial direction can press the thread milling cutter 1, which is held by the driving apparatus 2 with the shank 11, against the driving apparatus 2. Thus, the thread milling cutter 1 is braced between the workpiece W and driving apparatus 2, thereby being prevented from deflecting toward the central axis C2 of the internal threads 4.

The first end cutting edges 34 receive a force F1 in the direction vertical to the first end cutting edges 34 from the workpiece W. Since the angle θ1 formed by the first end cutting edge 34 and the imaginary plane P is set to 6° or less in this embodiment, substantially all of the force F1 acts in the axial direction. The force F1 strengthens the axial bracing force generated in the thread milling cutter 1 between the workpiece W and driving apparatus 2, thereby reducing deflection of the thread milling cutter 1 toward the central axis C2 of the internal threads 4.

Furthermore, the first end cutting edges 34 provided in the embodiment allow the flank 24b to be shorter than that in the related art, and accordingly can reduce the force F2. As a result, the component F2b of the force F2 in the direction perpendicular to the axis in this embodiment can be made smaller in comparison with the related art, thereby further reducing deflection of the thread milling cutter 1.

As the diameter d3 passing through the boundary B between the flank 24b and first end cutting edge 34 and the axis C1 at the center is set greater, the axial bracing force generated in the thread milling cutter 1 can be located more outward in the direction perpendicular to the axis. Consequently, the thread milling cutter 1 can be made still harder to deflect toward the central axis C2 of the internal threads 4.

Furthermore, the thread milling cutter 1 having a longer diameter d3 can have shorter flanks 24b, and therefore the component F2b of the force F2 in the direction perpendicular to the axis can be reduced. This can make the thread milling cutter 1 still harder to deflect toward the central axis C2 of the internal threads 4.

However, the shorter the flanks 24b of the front cutting edges 24 are, the more the load is concentrated on the flanks 24b. The concentrated load can easily wear the flanks 24b and decreases the durability of the front cutting edges 24, and may resultantly shorten the tool life of the thread milling cutter 1.

If the diameter d3 is greater than the minor diameter d2 at the root 20a, the cutting amount of the workpiece W by the flanks 24b is reduced. The part of the workpiece W that the flank 24b could not cut is cut by the flanks 29b on the front end side of the rear cutting edges 29 instead. Accordingly, the load applied to the rear cutting edge 29 increases. Because of this, the rear cutting edges 29 are susceptible to wear and therefore become less durable, which may shorten the tool life of the thread milling cutter 1.

As described above, the thread milling cutter 1 having the diameter d3 at the boundary B that is set to be equal to or greater than the minor diameter d2 can generate an axial bracing force more outward in the direction perpendicular to the axis, and accordingly can reduce the component F2b of the force F2 in the direction perpendicular to the axis in comparison with the case where the diameter d3 is set to be less than the minor diameter d2. This can further reduce deflection of the thread milling cutter 1 toward the central axis C2 of the internal threads 4. As a result, the number of times in which the driving apparatus 2 corrects the thread milling cutter 1 can be reduced, while the tool life of the thread milling cutter 1 can be extended.

The diameter d3 is set to be equal to or greater than the minor diameter d2; however, the difference between the diameter d3 and minor diameter d2 preferably should be small, and more preferably there should be no difference. As the difference becomes smaller, the load concentrated on the flanks 24b can be relieved, and the cutting amount of the workpiece W by the flanks 24b can be optimized. These configurations consequently achieve the durability of the front cutting edges 24 and rear cutting edges 29 and the deflection resistance of the thread milling cutter 1, thereby extending the tool life of the thread milling cutter 1 and reducing the number of times in which the driving apparatus 2 corrects the thread milling cutter 1.

The width d1 of the first end cutting edges 34 is set to be preferably 10% or less of the minor diameter d2 at the root 20a. If the width d1 is greater than 10% of the minor diameter d2, the cutting resistance between the first end cutting edges 34 and workpiece W is increased. Such a high cutting resistance may increase vibrations in the thread milling cutter 1 during cutting operation, which causes a reduction in machining accuracy of the thread milling cutter 1 and wear and breakage of the thread cutting edges 20a, 24, 29 and end cutting edges 33.

By setting the width d1 to be 10% or less of the minor diameter d2, the cutting resistance between the first end cutting edges 34 and workpiece W can be sufficiently decreased. This width setting can provide the machining accuracy of the thread milling cutter 1, while reducing wear and breakage of the thread cutting edges 20a, 24, 29 and end cutting edges 33 to extend the tool life of the thread milling cutter 1.

The second end cutting edges 35 are angled more toward the rear end than the first end cutting edges 34, and the angle θ2 formed by the imaginary plane P and the second end cutting edges 35 is set to be greater than the angle θ1 formed by the imaginary plane P and the first end cutting edges 34. Therefore, the cutting resistance between the end cutting edges 33 and workpiece W can be reduced in comparison with the case where the end cutting edges 33 are made up with only the first end cutting edges 34 without the second end cutting edges 35. This angle setting can provide the machining accuracy of the thread milling cutter 1, while reducing wear and breakage of the thread cutting edges 20a, 24, 29 and end cutting edges 33 to extend the tool life of the thread milling cutter 1.

EXAMPLES

With reference to examples, the present invention will be more specifically described below. However, the present invention is not limited to the following examples. Used in the examples below are the thread milling cutters 1 described in the above embodiment with a width d1 and angle θ1 of specific values. In all examples and a comparative example, the angle θ2 is set to be 10°, and the angle θ3 is set to be 30°.

First, descriptions will be given about the first example having first end cutting edges 34, and a comparative example having no first end cutting edges 34. The thread milling cutter used in the first example is fabricated so as to have an angle θ1 of 0° to +1°, a width d1 of 0.19 mm, and a minor diameter d2 of 3.17 mm. The ratio of the width d1 to the minor diameter d2, d1/d2, is 6% (an error of ±0.4%). Note that "+" sign of the angle θ1 denotes that the first end cutting edges 34 are angled more toward the rear end as it is closer to the axis C1. In addition, the width d1 is set within an error of ±0.02 mm, and the errors of the widths d1 in all the examples are set to fall within the same limit. The error of the ratio d1/d2 is set to ±0.4% for all the examples.

The comparative example uses a conventional thread milling cutter 40 that is configured in the same manner as that used in the first example, but has no first end cutting edges 34.

Durability tests were conducted on the thread milling cutters of the first example and comparative example by evaluating how many internal threads were formed in a workpiece W by using a vertical machining center (driving apparatus 2). The internal threads to be formed have a nominal diameter of M5×0.8 and a threading length of 9.6 mm, and were in class 6H defined by Japanese Industrial Standards (JIS). The workpiece W was a steel of SKD 11 (60 HRC). More specifically, the tool radius offset was adjusted such that a step gauge having a pitch diameter +0.080 could advance into the internal threads twelve turns, but a step gauge having a pitch diameter +0.100 could not advance twelve turns or more, and then, the durability tests were started. The durability test was stopped when a GO-side plug gauge (hereinafter referred to as "GP gauge") stopped advancing into the internal threads, and was restarted after tool radius correction. The number of passes was set to one. In addition, the coolant used in this test was water-soluble, the cutting speed was 45 m/min, and the feed per tooth was 0.023 mm/t.

Table 1 shows the durability test results presenting the number of internal threads formed in the durability tests. As shown in Table 1, the first example having the first end cutting edges 34 required a fewer number of corrections by the driving apparatus 2 and could form a greater number of internal threads than the first comparative example having no first end cutting edges 34 could, and therefore extended its tool life.

TABLE 1

| | No correction | First correction | Second correction | Third correction | Total |
|---|---|---|---|---|---|
| First example | 84 | 110 | 10 | — | 204 |
| Comparative example | 31 | 61 | 33 | 11 | 136 |

Next, the second to fifth examples having different widths d1 are compared. The thread milling cutter used in the second example was fabricated so as to have an angle θ1 of 0° to +1°, a minor diameter d2 of 4.86 mm, and a width d1 of 0.1 mm. The ratio of the width d1 to the minor diameter d2, d1/d2, was 2%. The thread milling cutter used in the third example was fabricated in the same manner as the second example, except that the width d1 was 0.2 mm, and the ratio d1/d2 was 4%. The thread milling cutter used in the fourth example was fabricated in the same manner as the second example, except that the width d1 was 0.3 mm, and the ratio d1/d2 was 6%. The thread milling cutter used in the fifth example was fabricated in the same manner as the second example, except that the width d1 was 0.5 mm, and the ratio d1/d2 was 10%.

Durability tests were conducted on the thread milling cutters of the second to fifth examples by evaluating how many internal threads were formed in a workpiece W by using a vertical machining center (driving apparatus 2). The internal threads to be formed have a nominal diameter of M8×1.25 and a threading length of 8 mm, and were in class 6H defined by JIS. The workpiece W was a steel of SKD 11 (59 to 61 HRC). More specifically, the tool radius offset was adjusted such that a step gauge having a pitch diameter +0.080 could advance into the internal threads ten turns, but a step gauge having a pitch diameter +0.100 could not advance ten turns or more, and then, the durability tests were started. The durability test was stopped when a GP gauge stopped advancing into the internal threads, and was restarted after tool radius correction. The number of passes was set to one. In addition, the coolant was not used, but air blow was used instead, the cutting speed was 45 m/min, and the feed per tooth was 0.04 mm/t.

The number of internal threads formed in these durability tests was 130 in the second example with a ratio d1/d2 of 2%, 145 in the third example with a ratio d1/d2 of 4%, 152 in the fourth example with a ratio d1/d2 of 6%, and 136 in the fifth example with a ratio d1/d2 of 10%. In addition, the number of corrections was zero in all the second to fifth examples.

These test results clearly demonstrate that the number of formed internal threads increases with an increase in the ratio d1/d2 up to about 6%, but decreases when the ratio d1/d2 exceeds about 6%. This is probably because the increase in the ratio d1/d2 can increase the axial force F1 received by the first end cutting edges 34, but also increases the cutting resistance between the first end cutting edges 34 and workpiece W. Therefore, the ratio d1/d2 set in the range from 4% to 10% can increase the number of the internal threads to be formed and extend the tool life. Furthermore, the ratio d1/d2 set in the range from 5% to 8% can further extend the tool life.

Next, the sixth to ninth examples having different angles θ1 are compared. The thread milling cutter used in the sixth example was fabricated so as to have an angle θ1 of 0° to +1°, a minor diameter d2 of 4.86 mm, and a width d1 of 0.3 mm. The ratio of the width d1 to the minor diameter d2, d1/d2, was 6%. The thread milling cutter has flutes 14 on the front end face of the body 12, and the flutes 14 of the sixth example is increased in width (circumferential size) to extend the distance from the axis C1 to bottom relief faces 32 about 1.5 times longer than the distance of the fourth example.

The thread milling cutter used in the seventh example was fabricated in the same manner as the sixth example, except that the angle θ1 was 1° to 2°. The thread milling cutter used in the eighth example was fabricated in the same manner as the sixth example, except that the angle θ1 was 3° to 4°. The thread milling cutter used in the ninth example was fabricated in the same manner as the sixth example, except that the angle θ1 was 5° to 6°.

The thread milling cutters with different angles θ1 in the sixth to ninth examples were submitted to the same durability tests as those conducted on the thread milling cutters with different widths d1 in the second to fifth examples. Table 2 shows the durability test results presenting the number of internal threads formed in the durability tests.

TABLE 2

| | No correction | First correction | Second correction | Total |
|---|---|---|---|---|
| Sixth example | 110 | 62 | 13 | 185 |
| Seventh example | 113 | 79 | 16 | 208 |
| Eighth example | 133 | 49 | 15 | 197 |
| Ninth example | 114 | 69 | 6 | 189 |

Table 2 clearly shows that all the sixth to ninth examples required the same number of corrections; however, the number of internal threads formed peaked with the seventh example having an angle θ1 of 1° to 2°, and decreased as the angle θ1 departs from 1° to 2°. This is probably because the axial bracing force generated in the thread milling cutter can be increased as the angle θ1 approaches 0°, and the cutting resistance between the first end cutting edges 34 and workpiece W becomes particularly high when the angle θ1 is 0°.

Therefore, the thread milling cutter with an angle θ1 of greater than 0° can form a greater number of the internal threads, and can extend its tool life. Furthermore, the angle θ1 set to be 1° to 3°, or more preferably 1° to 2°, can further extend the tool life.

Although the present invention has been described with reference to the embodiment and examples, it can be readily inferred that the invention is not limited to the embodiment, and various modifications can be made without departing from the scope of the invention. For instance, the numeric values used in the embodiment and examples are merely examples, and of course can be replaced with other numeric values.

Although the thread milling cutter in this embodiment includes a single thread in the front thread portion 21 and two threads in the rear thread portion 26, the present invention is not always limited to the embodiment. For instance, the rear thread portion 26 may have one thread, or three threads or more. In addition, the front thread portion 21 can be identical in shape to the rear thread portion 26.

Although the first cutting section 20 and second cutting section 30 are partitioned into four parts in the circumferential direction by a plurality of flutes 13, 14, respectively, in this embodiment, the present invention is not always limited to the embodiment. For instance, the first cutting section 20 and second cutting section 30 may be partitioned into two, three, five, or more in the circumferential direction by the flutes 13, 14.

Although the thread milling cutters in the examples have the first end cutting edges 34 perpendicular to the axis C1 or the first end cutting edges 34 angled more toward the rear end of the tool body 10 as being closer to the axis C1, the present invention is not always limited to the examples. The first end cutting edges 34 may be angled toward the front end of the tool body 10 as being closer to the axis C1. Since the end cutting edges 33 are rotationally symmetrical about the axis C1, the axial bracing force generated in the thread milling cutter 1 between the workpiece W and driving apparatus 2 can be enhanced as long as the angle θ1 is 6° or less, irrespective of the positive or negative sign of the angle θ1 formed by the imaginary plane P perpendicular to the axis C1 and the first end cutting edges 34. As a result, the thread milling cutter 1 can be made harder to deflect toward the central axis C2 of the internal threads 4.

The invention claimed is:

1. A thread milling cutter that cuts internal threads in a workpiece with a driving apparatus that rotates the thread milling cutter about an axis and moves the thread milling cutter relative to the workpiece, comprising:
    a tool body held and rotated about the axis by the driving apparatus;
    thread cutting edges in a plurality of threads projecting in directions perpendicular to the axis from a front end side of an outer circumference of the tool body; and
    end cutting edges formed on a front end face of the tool body, wherein
    each of the end cutting edges includes a first end cutting edge that is connected to a front end of the thread cutting edge, and the first end cutting edge and an imaginary plane perpendicular to the axis form an angle of 6° or less, the imaginary plane intersecting the first end cutting edge, and
    each of the end cutting edges includes a second end cutting edge that is connected to an end of the first end cutting edge on the side closer to the axis, and is angled more toward a rear end than the first end cutting edge, and
    an angle formed by the imaginary plane perpendicular to the axis and the second end cutting edges is set to be greater than the angle formed by the imaginary plane perpendicular to the axis and the first end cutting edges, wherein
    a diameter passing through the axis at a center is equal to a minor diameter between the threads,
    the diameter is twice a radius from the axis to a boundary between the thread cutting edges and the first end cutting edges, and
    the minor diameter is twice a distance from the axis to roots between the threads.

2. The thread milling cutter according to claim 1, wherein the size of the first end cutting edges in the direction perpendicular to the axis is set to 10% or less of the minor diameter between the threads.

3. The thread milling cutter according to claim 1, wherein an angle formed by the first end cutting edges and the imaginary plane is set to be greater than 0°.

* * * * *